United States Patent
Suzuki (10) Patent No.: US 7,482,779 B2
(45) Date of Patent: Jan. 27, 2009

(54) CONTROL APPARATUS OF ELECTRICITY ACCUMULATION MECHANISM

(75) Inventor: Yusuke Suzuki, Toyota (JP)

(73) Assignee: Toyota Jidosha Kabushiki Kaishi, Toyota (JP)

( * ) Notice: Subject to any disclaimer, the term of this patent is extended or adjusted under 35 U.S.C. 154(b) by 116 days.

(21) Appl. No.: 10/961,270

(22) Filed: Oct. 12, 2004

(65) Prior Publication Data

US 2005/0083017 A1   Apr. 21, 2005

(30) Foreign Application Priority Data

Oct. 20, 2003  (JP) ............................. 2003-359126

(51) Int. Cl.
*H02J 7/00* (2006.01)
(52) U.S. Cl. .................... 320/106; 320/104; 903/942
(58) Field of Classification Search ................ 320/106, 320/104; 903/942
See application file for complete search history.

(56) References Cited

U.S. PATENT DOCUMENTS

| | | |
|---|---|---|
| 5,631,533 A | 5/1997 | Imaseki |
| 5,965,991 A | 10/1999 | Koike et al. |
| 6,133,707 A * | 10/2000 | Kikuchi et al. ............... 320/104 |
| 6,158,541 A * | 12/2000 | Tabata et al. ................. 180/165 |
| 6,232,744 B1 | 5/2001 | Kawai et al. |
| 2002/0157882 A1 | 10/2002 | Kubo et al. |
| 2003/0169001 A1 | 9/2003 | Murakami et al. |

FOREIGN PATENT DOCUMENTS

| | | |
|---|---|---|
| EP | 0 841 208 A1 | 5/1998 |
| JP | A 07-255133 | 10/1995 |
| JP | A-10-4602 | 1/1998 |
| JP | A-10-14004 | 1/1998 |
| JP | A 11-224697 | 8/1999 |
| JP | A-2003-9406 | 1/2003 |
| JP | A 2003-087901 | 3/2003 |
| JP | A 2003-199211 | 7/2003 |
| JP | A-2003-297435 | 10/2003 |

* cited by examiner

*Primary Examiner*—Gary L Laxton
*Assistant Examiner*—Yalkew Fantu
(74) *Attorney, Agent, or Firm*—Oliff & Berridge, PLC (57) ABSTRACT

A hybrid ECU executes a program that includes the steps of: determining whether a deterioration degree of a battery is greater than a predetermined degree; when the deterioration degree of the battery is greater than the predetermined value, tightening the regulation of charging/discharging power to/from the battery; determining whether the deterioration degree of the battery is smaller than the predetermined value and; when the deterioration degree of the battery is smaller than the predetermined value, relaxing the regulation of charging/discharging power to/from the battery.

8 Claims, 10 Drawing Sheets

FIG. 11

CONTROL APPARATUS OF ELECTRICITY ACCUMULATION MECHANISM

This nonprovisional application is based on Japanese Patent Application No. 2003-359126 filed with the Japan Patent Office on Oct. 20, 2003, the entire contents of which are hereby incorporated by reference.

BACKGROUND OF THE INVENTION

1. Field of the Invention

The present invention relates to a control apparatus regulating charging/discharging power of an electricity accumulation mechanism, and particularly, to a control apparatus of an electricity accumulation mechanism adjusting regulation in accordance with a deterioration degree of the electricity accumulation mechanism.

2. Description of the Background Art

Recently, hybrid cars, fuel-cell vehicles and electric vehicles running by the drive power from a motor are attracting attention as a measure against environmental problems. To such a vehicle, a capacitor (condenser) or a battery (secondary cell) is mounted in order to accumulate power to be supplied to the motor. Such a capacitor or battery has a property that it deteriorates by loads and that the performance is impaired. Techniques for regulating charging/discharging power in accordance with a deterioration degree have been proposed, so that such deterioration is suppressed and the lifetime is increased.

Japanese Patent Laying-Open No. 7-255133 discloses a charging/discharging control apparatus for a secondary cell, which is capable of alleviating gradual increase in a deterioration rate of the capacitance and securing a long lifetime, even with a secondary cell having a prolonged history. The charging/discharging control apparatus disclosed in Japanese Patent Laying-Open No. 7-255133 is a charging/discharging control apparatus for a secondary cell. The charging/discharging control apparatus includes a discharge control unit stopping discharging if the voltage of the secondary cell becomes lower than a prescribed reference value when the secondary cell is discharged, a charge control unit stopping charging if the voltage of the secondary cell becomes higher than a prescribed reference value when the secondary cell is charged, and a history estimation unit estimating the history of the secondary cell based on the state of the secondary cell. The discharge control unit is configured to correct the reference value for stopping discharging to be raised in accordance with a history estimation value by the history estimation unit, while the charge control unit is configured to correct the reference value for stopping charging to be decreased in accordance with a history estimation value by the history estimation unit.

According to the invention disclosed by the publication, the history estimation unit estimates the history based on the state of the secondary cell, the discharge control unit corrects the reference voltage value stopping discharging so as to increase in accordance with the history, and the charge control unit correct the reference voltage value stopping charging so as to decrease in accordance with the history. Thus, gradual increase in the deterioration rate of the capacitance by the history is alleviated, and the lifetime of the secondary cell is increased.

However, according to the charging/discharging apparatus disclosed in Japanese Patent Laying-Open No. 7-255133, in accordance with history, the reference voltage value stopping discharging is corrected to be increased, while the reference voltage value stopping charging is corrected to be decreased. Accordingly, regulation of the secondary cell is constantly tightened. Therefore, for example even when the vehicle is driven so as to eliminate excessive loads on the electricity accumulation mechanism, i.e., even when the electricity accumulation mechanism is actuated so as to suppress the deterioration degree of the electricity accumulation mechanism, the regulation is tightened. Thus, there has been a problem that the performance of the electricity accumulation mechanism cannot fully be utilized.

SUMMARY OF THE INVENTION

An object of the present invention is to make full use of the performance of an electricity accumulation mechanism in accordance with a deterioration degree based on an actuation state of the electricity accumulation mechanism.

Another object of the present invention is to suppress deterioration of the electricity accumulation mechanism.

Still another object of the present invention is to precisely determine a deterioration degree of the electricity accumulation mechanism.

A control apparatus of an electricity accumulation mechanism according to one aspect of the present invention is a control apparatus of an electricity accumulation mechanism mounted on a vehicle. The control apparatus includes: a regulation unit regulating charging power to the electricity accumulation mechanism and discharging power from the electricity accumulation mechanism; a detect unit detecting a value related to at least one of current values of charging power to the electricity accumulation mechanism and discharging power from the electricity accumulation mechanism, temperature of the electricity accumulation mechanism and a rate of change in an acceleration pedal position; a storage unit storing a history related to the detected value; a determination unit determining a deterioration degree of the electricity accumulation mechanism based on the stored history; and an adjustment unit adjusting regulation by the regulation unit based on the deterioration degree.

According to the present invention, a value related to at least one of current values of charging power to the electricity accumulation mechanism and discharging power from the electricity accumulation mechanism, temperature of the electricity accumulation mechanism and a rate of change in an acceleration pedal position is detected by the detect unit, and the history thereof is stored in the storage unit. Thus, the actuation state of the electricity accumulation mechanism in a predetermined period can be stored. Additionally, the deterioration degree of the electricity accumulation mechanism is determined based on the stored history, i.e., the actuation state of the electricity accumulation mechanism. Based on the deterioration degree thus determined, regulation by the regulation unit is adjusted by the adjustment unit. Here, for example, if the regulation is relaxed when the deterioration degree is smaller than a predetermined deterioration degree, and tightened when the deterioration degree is greater, then in case of the former increase in loads on the electricity accumulation mechanism is tolerated and in case of the latter loads on the electricity accumulation mechanism can be suppressed. As a result, it becomes possible to make full use of the performance of the electricity accumulation mechanism in accordance with the deterioration degree based on the actuation state of the electricity accumulation mechanism.

A control apparatus of an electricity accumulation mechanism according to another aspect of the present invention is a control apparatus of an electricity accumulation mechanism mounted on a vehicle. The control apparatus includes a regulation unit regulating charging power to the electricity accumulation mechanism and discharging power from the electricity accumulation mechanism; a detect unit detecting a value related to actuation of the electricity accumulation mechanism; a storage unit storing a history related to the detected value; a determination unit determining a deterioration degree of the electricity accumulation mechanism based on the stored history; and a relaxation unit relaxing regulation by the regulation unit based on the deterioration degree.

According to the present invention, a value related to actuation of the electricity accumulation mechanism is detected by the detect unit, and the history thereof is stored. Thus, the actuation state of the electricity accumulation mechanism in a predetermined period can be stored. Additionally, the deterioration degree of the electricity accumulation mechanism is determined based on the actuation state of the stored history, i.e., the actuation state of the electricity accumulation mechanism. Based on the deterioration degree thus determined, regulation by the regulation unit is relaxed by the relaxation unit. Here, for example, if the regulation is relaxed when the deterioration degree is smaller than a predetermined deterioration degree, then increase in loads on the electricity accumulation mechanism is tolerated to make full use of the performance of the electricity accumulation mechanism. As a result, it becomes possible to make full use of the performance of the electricity accumulation mechanism in accordance with the deterioration degree based on the actuation state of the electricity accumulation mechanism.

Preferably, the relaxation unit relaxes the regulation when the deterioration degree is determined to be smaller than a predetermined degree.

According to the present invention, the regulation is relaxed when the deterioration degree is determined to be smaller than a predetermined degree. Therefore, increase in loads on the electricity accumulation mechanism is tolerated to make full use of the performance of the electricity accumulation mechanism.

More preferably, the control apparatus further includes a tightening unit tightening the regulation when the deterioration degree is determined to be greater than a predetermined degree.

According to the present invention, the regulation is tightened when the deterioration degree is determined to be greater than a predetermined degree. Therefore, loads on an electricity accumulation mechanism with deteriorated performance can be suppressed, and deterioration of the electricity accumulation mechanism can be suppressed.

More preferably, the control apparatus further includes a calculation unit calculating a frequency of detecting a value, which is in a predetermined range in relation to actuation of the electricity accumulation mechanism, based on the stored history. The determination unit determines that a deterioration degree of the electricity accumulation mechanism is smaller than a predetermined degree when the calculated frequency is less than a predetermined frequency.

According to the present invention, the frequency of detecting a value, which is in a predetermined range in relation to actuation of the electricity accumulation mechanism, is calculated, and the deterioration degree of the electricity accumulation mechanism is determined to be smaller than a predetermined degree when the calculated frequency is less than a predetermined frequency. Thus, loads on the electricity accumulation mechanism can be analyzed more precisely, and the deterioration degree of the electricity accumulation mechanism can be determined more precisely.

More preferably, the control apparatus further includes a map storage unit storing a map related to regulation of charging power to the electricity accumulation mechanism and discharging power from the electricity accumulation mechanism. The regulation unit regulates charging power to the electricity accumulation mechanism and discharging power from the electricity accumulation mechanism based on the map. The relaxation unit changes the map to relax the regulation.

According to the present invention, a map related to regulation of charging power to the electricity accumulation mechanism and discharging power from the electricity accumulation mechanism is stored. Based on the map, charging power to the electricity accumulation mechanism and discharging power from the electricity accumulation mechanism are regulated. When the regulation is to be relaxed, the map is changed. Thus, by only changing the map, the regulation can be relaxed.

More preferably, the value related to actuation of the electricity accumulation mechanism is a value related to at least one of current values of charging power to the electricity accumulation mechanism and discharging power from the electricity accumulation mechanism, temperature of the electricity accumulation mechanism and a rate of change in an acceleration pedal position.

According to the present invention, as the value related to actuation of the electricity accumulation mechanism, a value related to at least one of current values of charging power to the electricity accumulation mechanism and discharging power from the electricity accumulation mechanism, temperature of the electricity accumulation mechanism and a rate of change in an acceleration pedal position is detected. Here, the deterioration degree of the electricity accumulation mechanism depends on current values of charging power to the electricity accumulation mechanism and discharging power from the electricity accumulation mechanism, and temperature of the electricity accumulation mechanism. Additionally, when charging power to the electricity accumulation mechanism and discharging power from the electricity accumulation mechanism are controlled in accordance with a rate of change in an acceleration pedal position, the deterioration degree of the electricity accumulation mechanism depends on the rate of change in an acceleration pedal position. Therefore, by detecting a value on which a deterioration degree of the electricity accumulation mechanism depends, and determining the deterioration degree of the electricity accumulation mechanism based on the history of the detected value, the deterioration degree can be determined precisely.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described referring to the figures. In the following description, identical parts are denoted by an identical reference character. Their names and functions are also identical. Accordingly, description thereof will not be repeated.

First Embodiment

Figure 1:
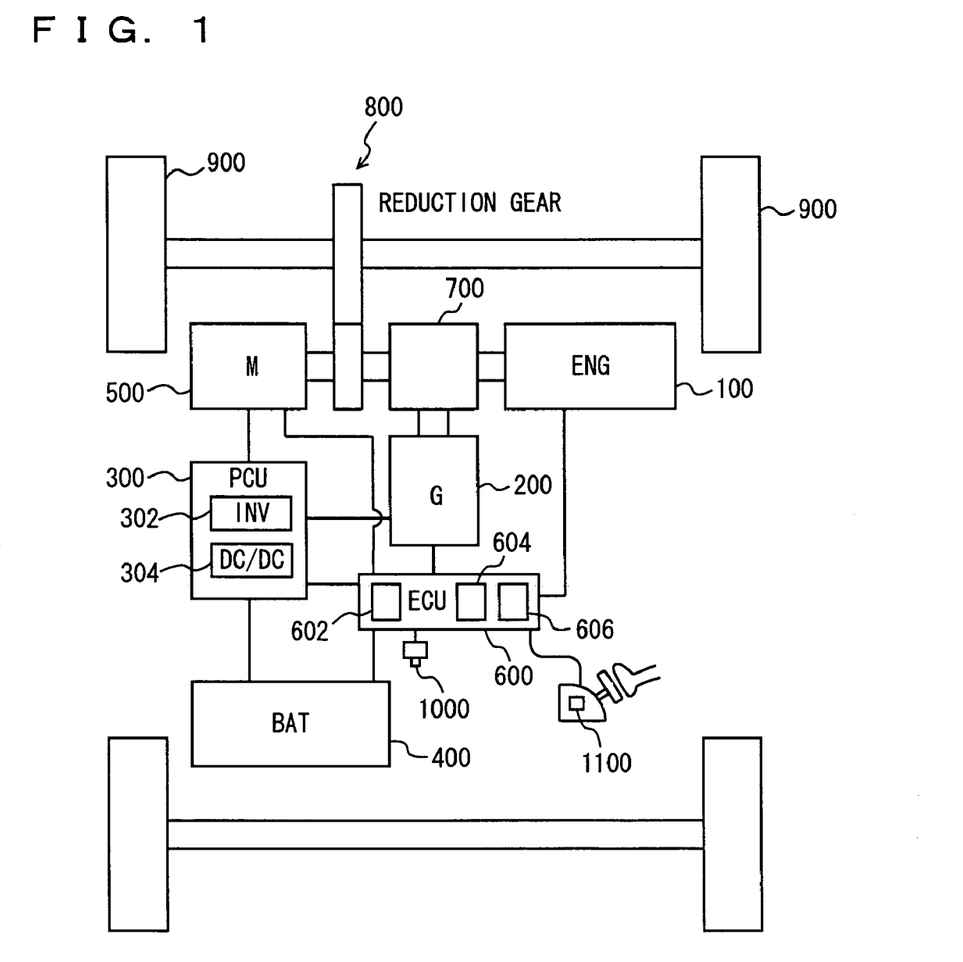
FIG. 1 is a control block diagram showing a hybrid vehicle to which a control apparatus according to a first embodiment of the present invention is mounted.

Referring to FIG. 1, a hybrid vehicle to which a control apparatus according to a first embodiment of the present invention is mounted includes an engine 100, a generator 200, a PCU (Power Control Unit) 300, a battery 400, a motor 500, and a hybrid ECU (Electronic Control Unit) 600 connected to all of these components. The control apparatus according to the embodiment of the present invention is realized by a program executed by hybrid ECU 600. While the present embodiment is described using a hybrid vehicle to which engine 100 is mounted, the present invention is not limited to a hybrid vehicle to which engine 100 is mounted and it is applicable to a hybrid vehicle to which a fuel cell is mounted in place of an engine (a fuel-cell vehicle), an electric vehicle to which only battery 400 is mounted or the like.

The motive power generated by engine 100 is split by a power split device. 700 into two routes. One of them is a route to drive wheels 900 through a reduction gear 800. The other is a route to drive generator 200 for generating power.

While the generator 200 generates power by the motive power of engine 100 split by power split device 700, the power generated by generator 200 is selectively used in accordance with the driving state of a vehicle, or SOC (State Of Charge) of battery 400. For example, under a normal running mode or a sudden acceleration mode, the power generated by generator 200 directly becomes the power for driving motor 500. On the other hand, when SOC of battery 400 is lower than a predetermined value, the power generated by generator 200 is converted from AC (Alternating Current) power to DC (Direct Current) power by inverter 302 of PCU 300, and after the voltage is adjusted by converter 304, it is accumulated in battery 400. This battery 400 is an assembled battery, in which a plurality of battery modules, each integrally formed of a plurality of battery cells, are serially connected. It should be noted that a capacitor (a condenser) may be used in place of battery 400.

Motor 500 is a three-phase AC motor. Motor 500 is driven by at least either power accumulated in battery 400 or power generated by generator 200. The drive power of motor 500 is transmitted to wheels 900 via reduction gear 800. Thus, motor 500 assists engine 100 in running the vehicle, or the vehicle runs only by the drive power from motor 500.

In regenerative braking of the hybrid vehicle, motor 500 is driven by wheels 900 via reduction gear 800, and motor 500 is actuated as a generator. Thus, motor 500 serves as a regenerative break that converts braking energy into power. The power generated by motor 500 is accumulated in battery 400 via inverter 302.

Hybrid ECU 600 includes CPU (Central Processing Unit) 602, a memory 604 and a counter 606. CPU 602 performs operation processing based on a driving state of the vehicle, an acceleration pedal position detected by an acceleration pedal position sensor 1100, a rate of change in the acceleration pedal position, position of the shift lever, SOC of battery 400, a map and a program stored in memory 604 and the like. Thus, hybrid ECU 600 controls equipment mounted on the vehicle so that the vehicle attains a desired driving state.

Figure 2:
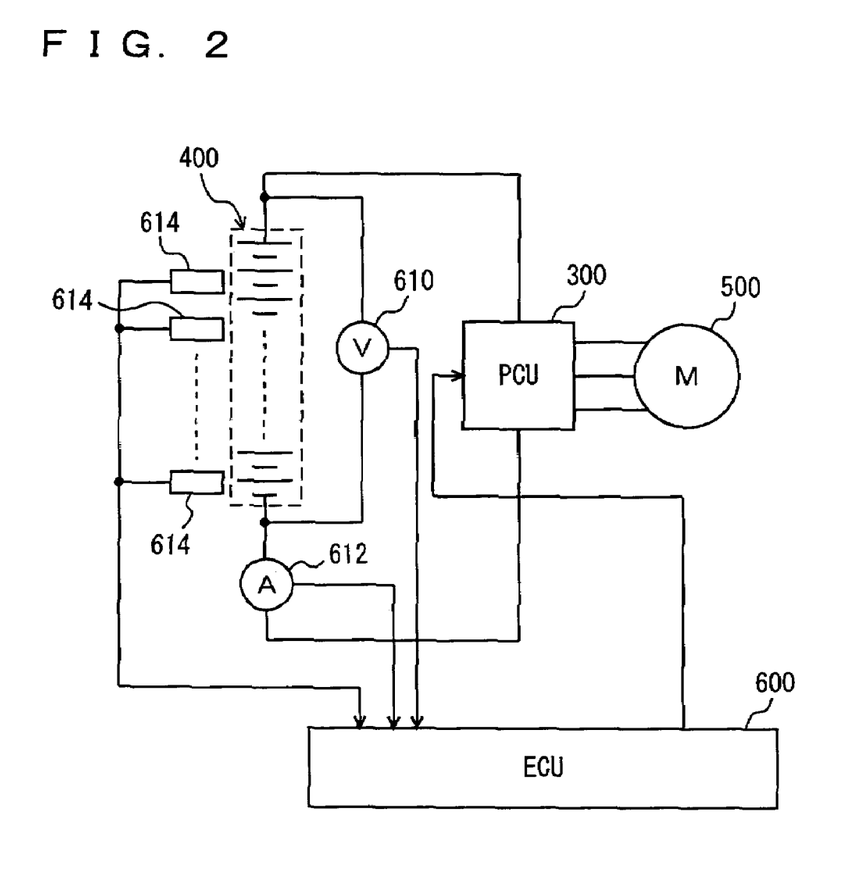
FIG. 2 is a control block diagram partially showing the hybrid vehicle to which the control apparatus according to the first embodiment of the present invention is mounted.

As shown in FIG. 2, a voltmeter 610 detecting charging/discharging voltage value of battery 400, an ammeter 612 detecting charging/discharging current value, and a battery temperature sensor 614 detecting battery temperature TB are connected to hybrid ECU 600. Hybrid ECU 600 calculates charging/discharging power value of battery 400 based on charging/discharging voltage value detected by voltmeter 610 and charging/discharging current value detected by ammeter 612. Hybrid ECU 600 calculates SOC of battery 400 by multiplying the charging/discharging current value. The sum of periods during which a charging/discharging current value is detected, and each of those periods during which charging/discharging current value is detected are counted by counter 606. The history of the charging/discharging current value detected by ammeter 612 and the periods counted by counter 606 is stored in memory 604. Thus, as the history of charging/discharging current value and the counted periods is stored, the actuating state of battery 400 is stored. It should be noted that, as the periods counted by counter 606, the length of time, the number of time, the traveling distance of the vehicle and the like may be employed as appropriate.

Hybrid ECU 600 sets a charging power regulation value that is a regulation value of power to be charged to battery 400 (hereinafter "charging power regulation value" is expressed as W(IN)), and a discharging power regulation value that is a regulation value of power to be discharged from battery 400 (hereinafter "discharging power regulation value" is expressed as W(OUT)). The charging power value to battery 400, and the discharging power value from battery 400 are regulated so as not to exceed these W(IN) and W(OUT). W(IN) and W(OUT) are set based on battery temperature TB, according to a charging/discharging power regulation map shown in FIG. 3. In this map, as battery temperature TB becomes higher than TB (1), the absolute values of W(IN) and W(OUT) decrease. When battery temperature TB reaches TB (3), W(IN) and W(OUT) become zero and charging/discharging to/from battery 400 is stopped. Similarly, as battery temperature TB becomes lower than TB (2), the absolute values of W(IN) and W(OUT) decrease. When battery temperature TB reaches TB (4), W(IN) and W(OUT) become zero and charging/discharging to/from battery 400 is stopped. In the map shown in FIG. 3, the maximum value of W(OUT) (the maximum value of discharging power) is A(1), while the minimum value of W(IN) (the maximum value of charging power) is B(1). In the present embodiment, W(OUT) is a positive value, and W(IN) is a negative value.

Figure 3:
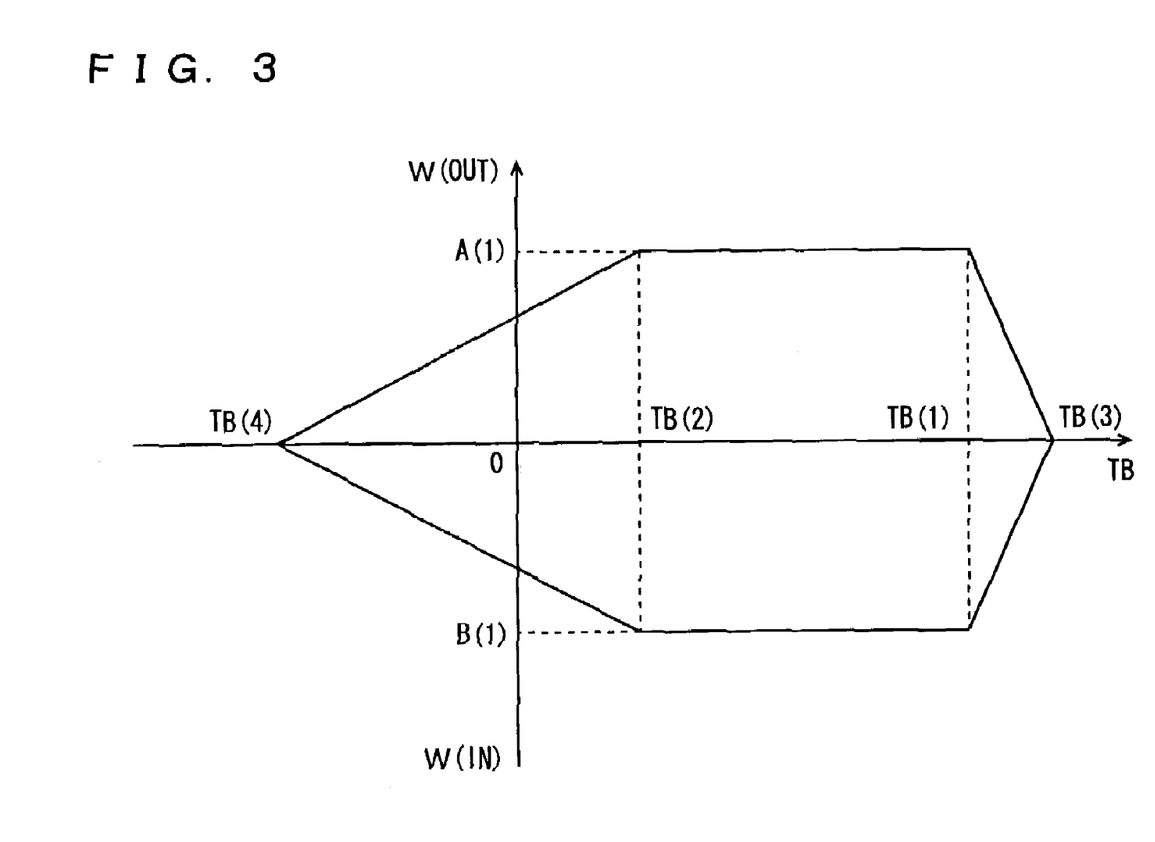
FIG. 3 shows a charging/discharging power regulation map.

The map shown in FIG. 3 is merely an example, and the present invention is not limited to this map. The parameters used to set W(IN) and W(OUT) may be not only battery temperature TB but also SOC of battery 400, voltage and the like, including any combinations thereof. As a method for regulating charging/discharging power to/from battery 400, any well-known general technique may be employed, and detailed description thereof is not repeated herein.

Figure 4:
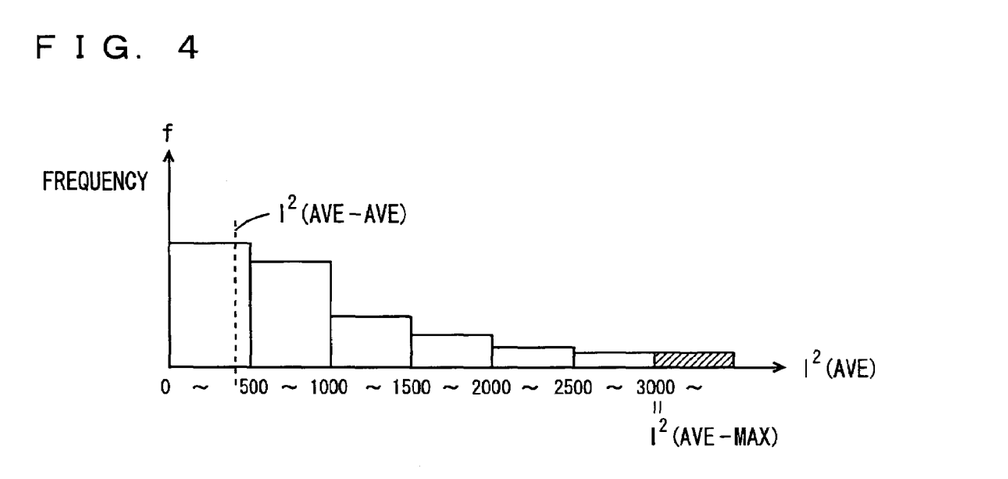
FIG. 4 is a frequency distribution graph showing a square-average value $I^2$ (AVE) of a charging/discharging current value and history of load frequency thereof.

As shown in FIG. 4, hybrid ECU 600 calculates square-average value $I^2(AVE)$ of a charge/discharge current value detected by ammeter 612, based on the history stored in memory 604. FIG. 4 is a frequency distribution graph, in which ordinate indicates load frequency, and abscissa indicates square-average value $I^2(AVE)$ of a charge/discharge current value. Here, square-average value $I^2(AVE)$ of a charge/discharge current value means an averaged value of a square of a charge/discharge current value in an instantaneous period. Any general technique may be used to calculate this value, and therefore detailed description thereof is not repeated herein. Hybrid ECU 600 calculates, for every square-average value, a proportion of each period during which square-average value $I^2(AVE)$ is detected (a period during which a charging/discharging current value corresponding to square-average value $I^2(AVE)$ is detected) in the sum of periods during which square-average value $I^2(AVE)$ is calculated (all periods during which a charging/discharging current value is detected) (hereinafter, this proportion is referred to as "load frequency"). Further, hybrid ECU 600 determines a deterioration degree of battery 400 using square-average value $I^2(AVE)$ of a charge/discharge current value and the load frequency thereof. This method for determining a deterioration degree will be described in detail later. By determining a deterioration degree in this manner, the deterioration degree based on the actuation state of battery 400 is determined. It should be noted that, the load frequency is not limited to the proportion of each period during which square-average value $I^2(AVE)$ is detected in the sum of periods during which square-average value $I^2(AVE)$ is calculated. In place of such a proportion, each period during which square-average value $I^2(AVE)$ is detected may directly be used.

Figure 5:
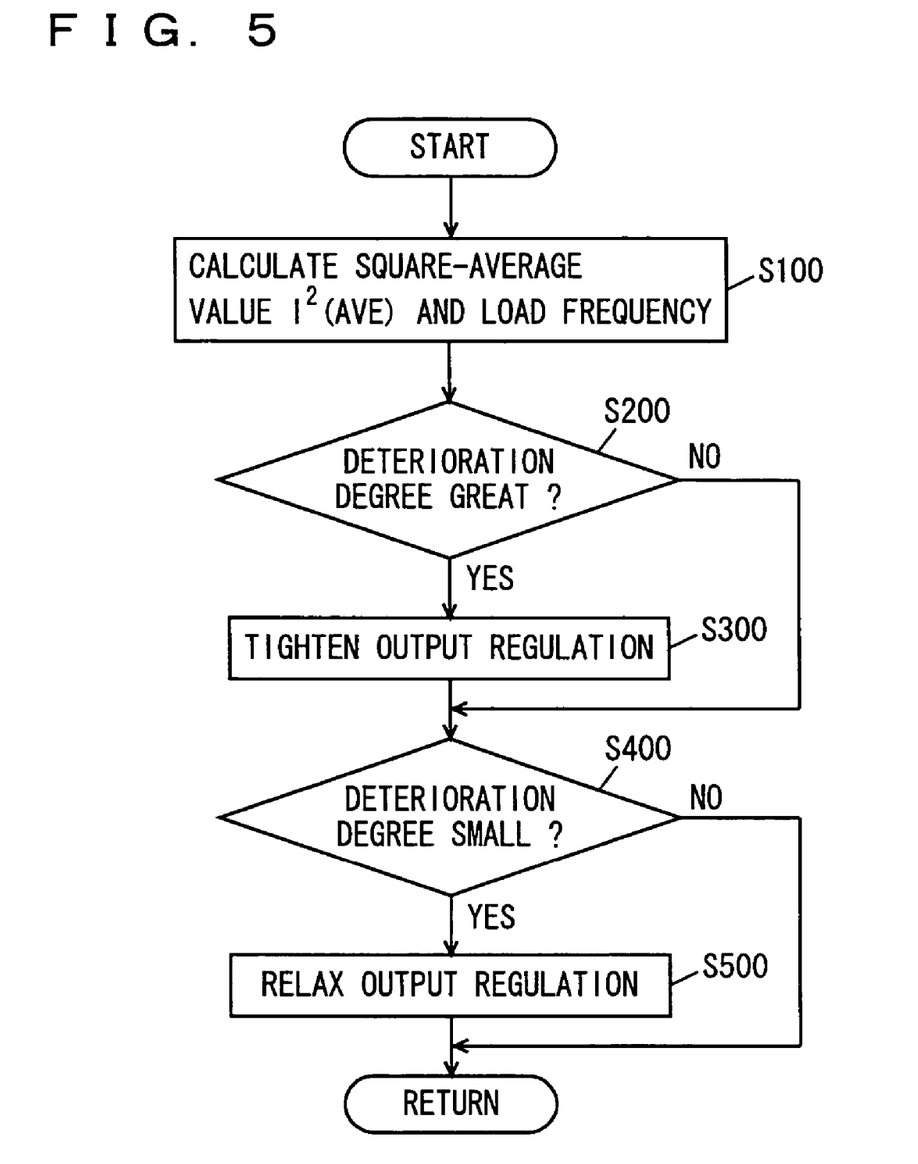
FIG. 5 is a flowchart showing a control configuration of a program executed by a hybrid ECU in the control apparatus according to the first embodiment of the present invention.

Referring to FIG. 5, a control configuration of a program executed by hybrid ECU 600 in the control apparatus according to the present embodiment will be described.

At step (hereinafter step is referred to as S) 100, hybrid ECU 600 calculates square-average value $I^2(AVE)$ of a charging/discharging current value and the load frequency.

At S200, hybrid ECU 600 determines whether the deterioration degree of battery 400 is greater than a predetermined degree. Here, when the total of load frequencies (the hatched portion in FIG. 4) of values greater than a predetermined maximum value $I^2(AVE-MAX)$ in relation to square-average value $I^2(AVE)$ of a charging/discharging current value is greater than a predetermined frequency, and when averaged value $I^2(AVE-AVE)$ of the calculated square-average value $I^2(AVE)$ of a charging/discharging current value is greater than a predetermined value, the deterioration degree of battery 400 is determined to be greater than a predetermined value. It should be noted that the deterioration degree of battery 400 may be determined to be greater than a predetermined value when either one of the conditions is satisfied, i.e., when the total of load frequencies of values greater than a predetermined maximum value $I^2(AVE-MAX)$ is greater than a predetermined frequency, or when averaged value $I^2(AVE-AVE)$ of the calculated square-average value $I^2(AVE)$ of a charging/discharging current value is greater than a predetermined value. When the deterioration degree of battery 400 is greater than a predetermined value (YES at S200), the process goes to S300. Otherwise, (NO at S200) the process goes to S400. At S300, hybrid ECU 600 changes the aforementioned charging/discharging power regulation map, and tightens the regulation of charging/discharging power to/from battery 400.

At S400, hybrid ECU 600 determines whether the deterioration degree of battery 400 is smaller than a predetermined degree. Here, when the total of load frequencies of values greater than a predetermined maximum value $I^2(AVE-MAX)$ in relation to square-average value $I^2(AVE)$ of a charging/discharging current value is less than a predetermined frequency, and when averaged value $I^2(AVE-AVE)$ of the calculated square-average value $I^2(AVE)$ of a charging/discharging current value is smaller than a predetermined value, the deterioration degree of battery 400 is determined to be smaller than a predetermined value. It should be noted that the deterioration degree of battery 400 may be determined to be smaller than a predetermined value when at least either one of the conditions is satisfied, i.e., when the total of load frequencies (the hatched portion in FIG. 4) of values greater than a predetermined maximum value $I^2(AVE-MAX)$ in relation to square-average value $I^2(AVE)$ of a charging/discharging current value is less than a predetermined frequency, or when averaged value $I^2(AVE-AVE)$ of the calculated square-average value $I^2(AVE)$ of a charging/discharging current value is smaller than a predetermined value. When the deterioration degree of battery 400 is smaller than a predetermined value (YES at S400), the process goes to S500. Otherwise, (NO at S400) the process ends. At S500, hybrid ECU 600 changes the aforementioned charging/discharging power regulation map, and relaxes the regulation of charging/discharging power to/from battery 400.

An operation of hybrid ECU 600 that is the control apparatus according to the present embodiment based on the aforementioned configuration and flowcharts will be described.

When square-average value $I^2(AVE)$ of a charge/discharge current value and the load frequency are calculated (S100), whether the deterioration degree of battery 400 is greater than a predetermined degree is determined (S200). Here, when the total of load frequencies of square-average value $I^2(AVE)$ of a charging/discharging current value greater than a predetermined maximum value $I^2(AVE-MAX)$ in relation to square-average value $I^2(AVE)$ of a charging/discharging current value is greater than a predetermined frequency, and when averaged value $I^2(AVE-AVE)$ of the calculated square-average value $I^2(AVE)$ of a charging/discharging current value is greater than a predetermined value, the deterioration degree of battery 400 is determined to be greater than a predetermined value (YES at S200). In this case, as indicated by an alternate long and short dash line in FIG. 6, the charging/discharging regulation map is changed so that the maximum value of W(OUT) and the minimum value of W(IN) are not changed and the regulation of charging/discharging power to/from battery 400 is tightened (S300). In the changed charging/discharging regulation map, as battery temperature TB becomes higher than TB(6) (TB(6)<TB(1)), the absolute values of W(IN) and W(OUT) decrease. When battery temperature TB reaches TB(3), W(IN) and W(OUT) become zero and charging/discharging to/from battery 400 is stopped. Thus, as the absolute values of W(IN) and W(OUT) are decreased based on the state of battery temperature TB being lower than TB(1), the regulation is tightened. It should be noted that method for tightening the regulation of charging/discharging power to/from battery 400 is not limited to the aforementioned method.

If the deterioration degree of battery 400 is determined not greater than a predetermined value (NO at S200), whether the deterioration degree of battery 400 is smaller than a predetermined value is determined (S400). Here, when the total of load frequencies of square-average value $I^2(AVE)$ of a charging/discharging current value greater than a predetermined maximum value $I^2(AVE-MAX)$ in relation to square-average value $I^2(AVE)$ of a charging/discharging current value is less than a predetermined frequency, and when averaged value $I^2(AVE-AVE)$ of the calculated square-average value $I^2(AVE)$ of a charging/discharging current value is smaller than a predetermined value, the deterioration degree of battery 400 is determined to be smaller than a predetermined value (YES at S400).

Figure 6:
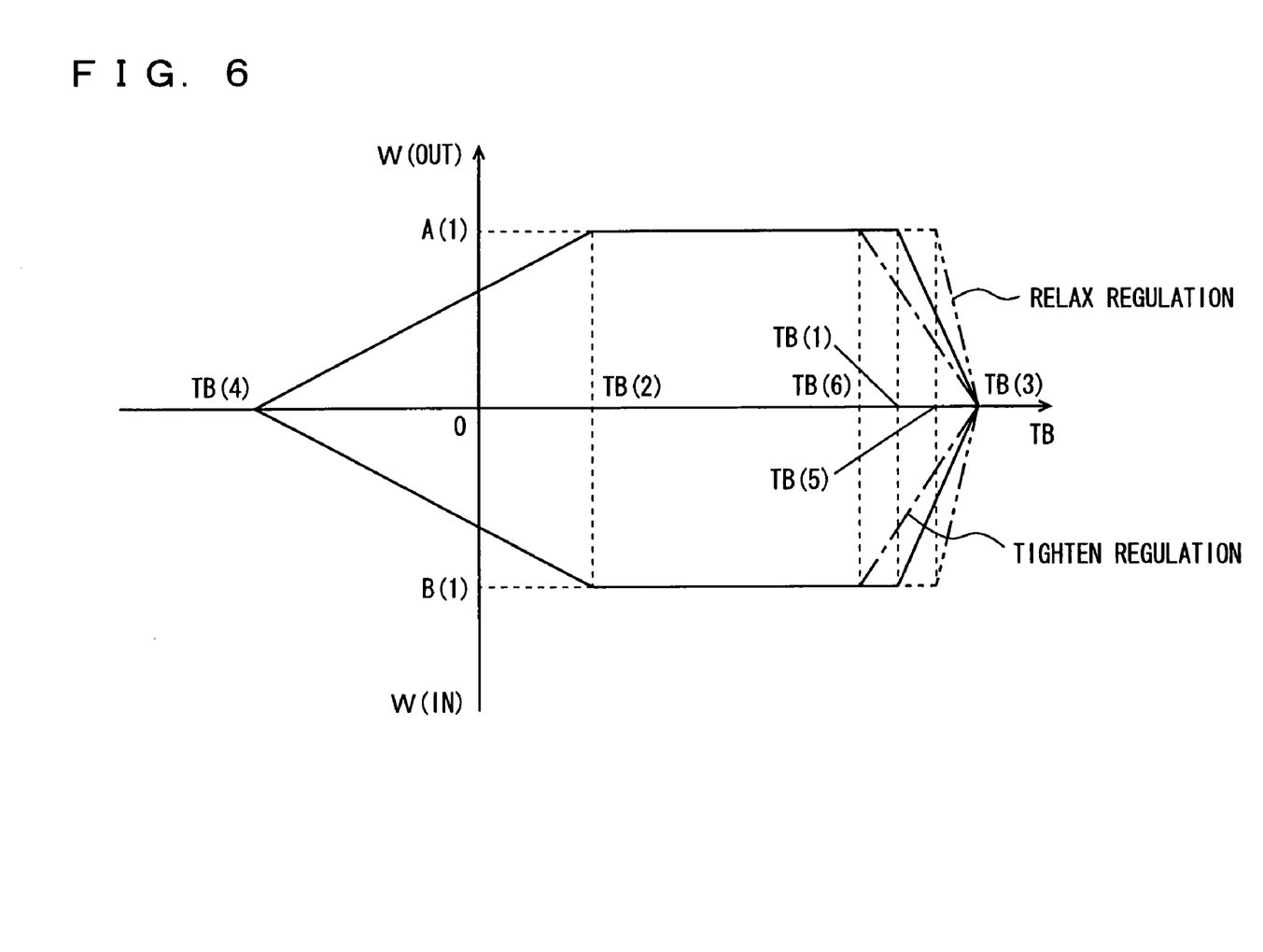
FIG. 6 shows a charging/discharging power regulation map changed by the hybrid ECU in the control apparatus according to the first embodiment of the present invention.

In this case, as indicated by an alternate long and double-short dash line in FIG. 6, the charging/discharging regulation map is changes so that the maximum value of W(OUT) and the minimum value of W(IN) are not changed and the regulation of charging/discharging power to/from battery 400 is relaxed (S500). In the changed charging/discharging regulation map, as battery temperature TB becomes higher than TB (5) (TB(5)>TB(1)), the absolute values of W(IN) and W(OUT) decrease. When battery temperature TB reaches TB (3), W(IN) and W(OUT) become zero and charging/discharging to/from battery 400 is stopped. Thus, as the absolute values of W(IN) and W(OUT) will not be decreased unless battery temperature TB becomes higher than TB(1), the regulation is relaxed. It should be noted that method for relaxing the regulation of charging/discharging power to/from battery 400 is not limited to this method.

As described above, hybrid ECU that is the control apparatus according to the present embodiment tightens the regulation of charging/discharging power to/from the battery when the deterioration degree of the battery is determined to be greater than a predetermined degree. It relaxes the regulation of charging/discharging power to/from battery when the deterioration degree of the battery is smaller than a predetermined degree. Thus, loads on the battery can be suppressed when the deterioration degree of the battery is great to suppress deterioration, and increase in loads on the battery can be tolerated when the deterioration degree of the battery is small to make full use of the performance of the battery.

Second Embodiment

Figure 7:
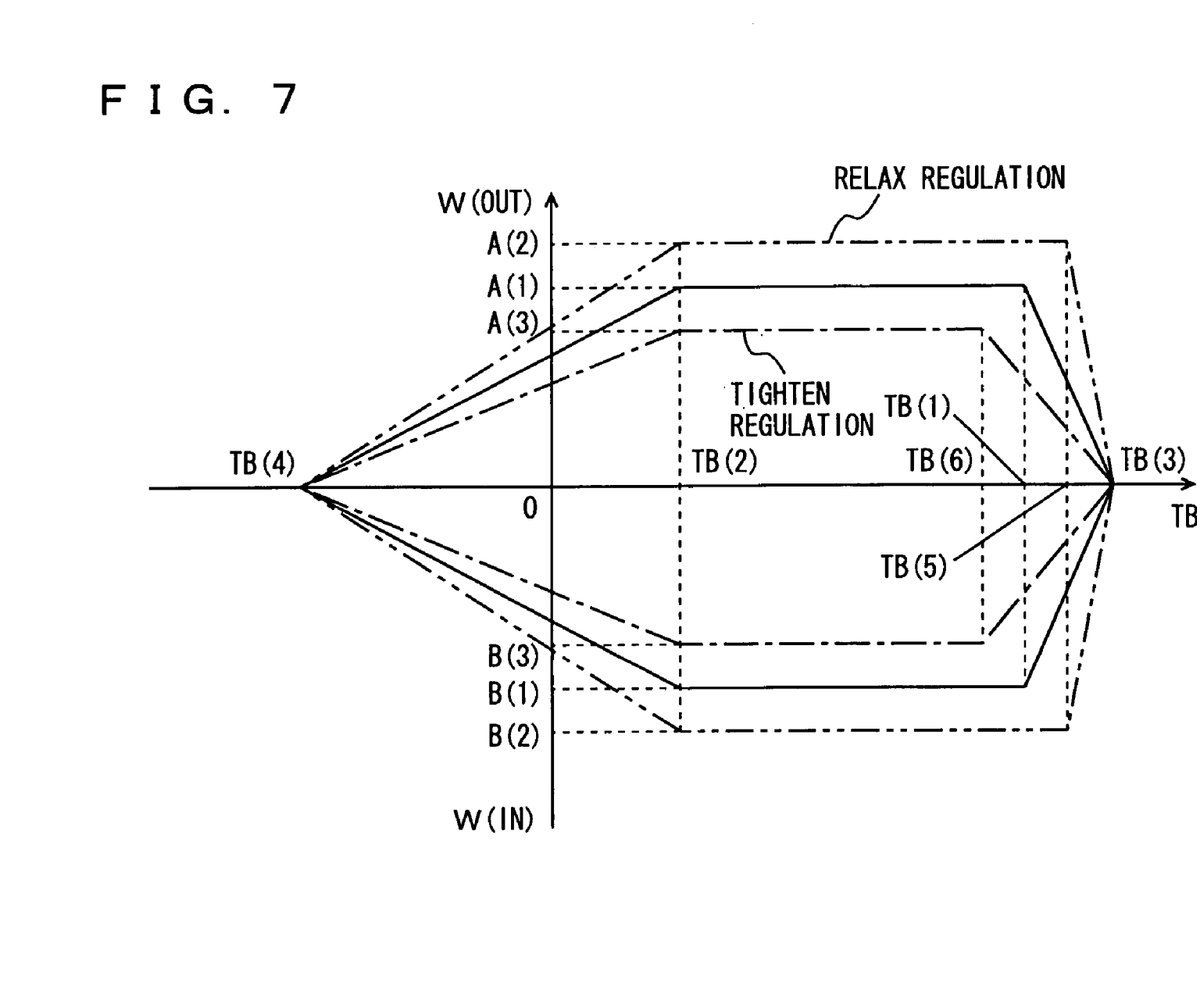
FIG. 7 shows a charging/discharging power regulation map changed by a hybrid ECU in a control apparatus according to a second embodiment of the present invention.

Referring to FIG. 7, a control apparatus according to a second embodiment of the present invention will be described. In the first embodiment described above, the maximum value of W(OUT) and the minimum value of W(IN) are not changed when the charging/discharging power regulation map is changed. On the other hand, in the present embodiment, the maximum value of W(OUT) and the minimum value of W(IN) are changed. Other hardware configuration and process flow are the same as in the first embodiment. Their respective functions are also the same. Accordingly, detailed description thereof will not be repeated here.

When the deterioration degree of battery 400 is determined to be greater than a predetermined value (YES at S200), as indicated by an alternate long and short dash line in FIG. 7, the charging/discharging regulation map is changed so that the regulation of charging/discharging power to/from battery 400 is tightened (S300). In the changed charging/discharging regulation map, as battery temperature TB becomes higher than TB (6) (TB(6)<TB(1)), the absolute values of W(IN) and W(OUT) decrease. When battery temperature TB reaches TB (3), W(IN) and W(OUT) become zero and charging/discharging to/from battery 400 is stopped. Thus, the absolute values of W(IN) and W(OUT) are decreased based on the state of battery temperature TB being lower than TB(1). Further, the maximum value of W(OUT) is decreased from A(1) to A(3) (A(1)>A(3)), while the minimum value of W(IN) is increased from B(1) to B(3) (B(1)<B(3)). In the present embodiment, W(IN) is a negative value and W(OUT) is a positive value.

When the deterioration degree of battery 400 is determined to be smaller than a predetermined value (YES at S400), as indicated by an alternate long and double-short dash line in FIG. 7, the charging/discharging regulation map is changed so that the regulation of charging/discharging power to/from battery 400 is relaxed (S500). In the changed charging/discharging regulation map, as battery temperature TB becomes higher than TB (5) (TB(5)>TB(1)), the absolute values of W(IN) and W(OUT) decrease. When battery temperature TB reaches TB (3), W(IN) and W(OUT) become zero and charging/discharging to/from battery 400 is stopped. Thus, the absolute values of W(IN) and W(OUT) are not decreased unless battery temperature TB becomes higher than TB(1). Further, the maximum value of W(OUT) is increased from A(1) to A(2) (A(2)>A(1)), while the minimum value of W(IN) is decreased from B(1) to B(2) (B(2)<B(1)).

As described above, the control apparatus according to the present embodiment changes the maximum value of W(OUT) and the minimum value of W(IN). Compared to the control apparatus according to the first embodiment described above, this enables to further tighten and relax the regulation.

Third Embodiment

Figure 8:
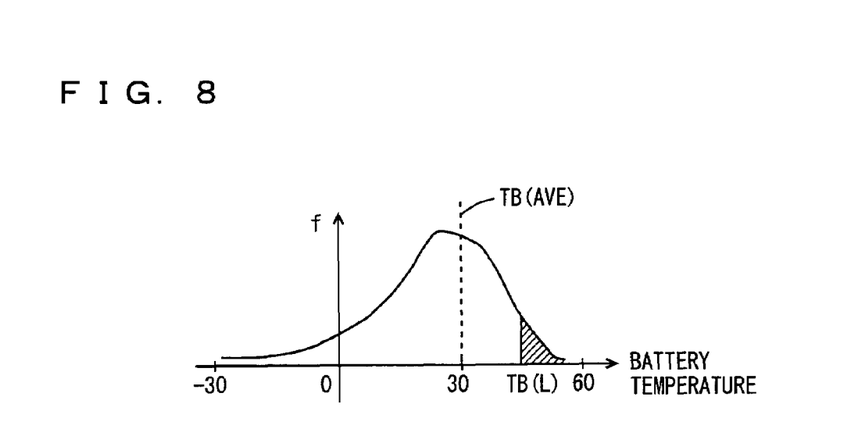
FIG. 8 is a frequency distribution graph showing battery temperature TB and a history of a load frequency thereof

Referring to FIG. 8, a control apparatus according to a third embodiment of the present invention will be described. In the first embodiment described above, hybrid ECU 600 determines the deterioration degree of battery 400 using square-average value $I^2(AVE)$ of a charging/discharging current value and the load frequency thereof On the other hand, in the present embodiment, the deterioration degree of battery 400 is determined using battery temperature TB and the load frequency thereof Other hardware configuration and process flow are the same as in the first embodiment. Their respective functions are also the same. Accordingly, detailed description thereof will not be repeated here.

Hybrid ECU 600 calculates the load frequency for each battery temperature TB detected by battery temperature sensor 614. The method for calculating load frequency for each battery temperature TB is the same as the method for calculating the load frequency of square-average value $I^2(AVE)$ of a charging/discharging current value as in the aforementioned first embodiment, and detailed description thereof is not repeated here.

When the total (the hatched portion of FIG. 8) of the load frequencies of battery temperature TB higher than a predetermined maximum value TB(L) in relation to battery temperature TB is greater than a predetermined frequency, and when averaged value TB(AVE) of the detected battery temperature TB is greater than a predetermined value, hybrid ECU 600 determines that the deterioration degree of battery 400 is greater than a predetermined value. It should be noted that the deterioration degree of battery 400 may be determined to be greater than a predetermined value when at least either one of the conditions is satisfied, i.e., when the total of the load frequencies of battery temperature TB higher than a predetermined maximum value TB(L) in relation to battery temperature TB is greater than a predetermined frequency, or when averaged value TB(AVE) of the detected battery temperature TB is greater than a predetermined value.

When the total of the load frequencies of battery temperature TB higher than a predetermined maximum value TB(L) in relation to battery temperature TB is less than a predetermined frequency, and when averaged value TB(AVE) of the detected battery temperature TB is smaller than a predetermined value, hybrid ECU 600 determines that the deterioration degree of battery 400 is smaller than a predetermined value. It should be noted that the deterioration degree of battery 400 may be determined to be smaller than a predetermined value when at least either one of the conditions is satisfied, i.e., when the total of the load frequencies of battery temperature TB higher than a predetermined maximum value TB(L) in relation to battery temperature TB is less than a predetermined frequency, or when averaged value TB(AVE) of the detected battery temperature TB is smaller than a predetermined value.

As described above, hybrid ECU 600 in the control apparatus according to the present embodiment determines the deterioration degree of battery 400 using battery temperature TB and the load frequency thereof Thus, the effect similar to that attained by the control apparatus according to the first embodiment can also be attained.

Fourth Embodiment

Figure 9:
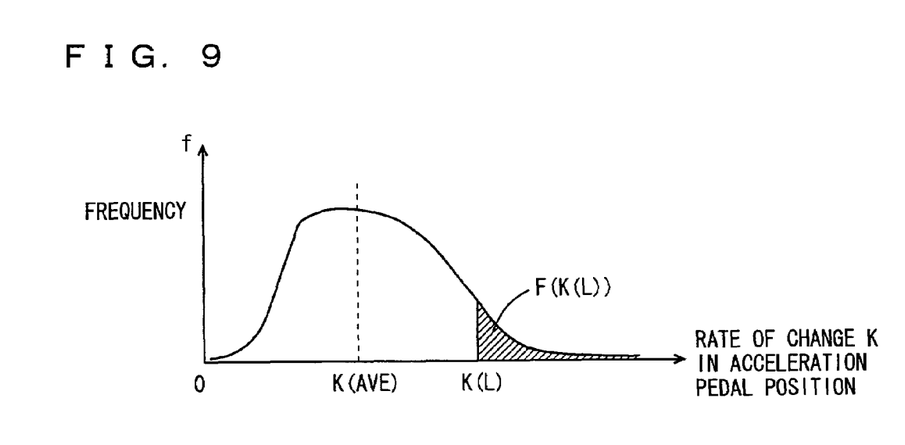
FIG. 9 is a frequency distribution graph showing a rate of change K in acceleration pedal position and a history of a load frequency thereof.

Referring to FIG. 9, a control apparatus according to a fourth embodiment of the present invention will be described. In the first embodiment described above, hybrid ECU 600 determines the deterioration degree of battery 400 using square-average value $I^2$(AVE) of a charging/discharging current value and the load frequency thereof In the present embodiment, the deterioration degree of battery 400 is determined using a rate of change K in an acceleration pedal position and the load frequency thereof Other hardware configuration and process flow are the same as in the first embodiment. Their respective functions are also the same. Accordingly, detailed description thereof will not be repeated here.

Hybrid ECU 600 calculates rate of change K in an acceleration pedal position and the load frequency for each rate of change K in an acceleration pedal position, based on an acceleration pedal position detected by an acceleration pedal position sensor 1100. The method for calculating load frequency of rate of change K in an acceleration pedal position is the same as the method for calculating load frequency of square-average value $I^2$(AVE) of a charging/discharging current value as in the aforementioned first embodiment, and detailed description thereof is not repeated here. When the total (the hatched portion of FIG. 9) of the load frequencies of rate of change K in an acceleration pedal position greater than a predetermined maximum value K(L) in relation to rate of change K in an acceleration pedal position is greater than a predetermined frequency, and when averaged value K(AVE) of rate of change K in an acceleration pedal position is greater than a predetermined value, hybrid ECU 600 determines that the deterioration degree of battery 400 is greater than a predetermined value.

It should be noted that the deterioration degree of battery 400 may be determined to be greater than a predetermined value when at least either one of the conditions is satisfied, i.e., when the total of the load frequencies of rate of change K in an acceleration pedal position greater than a predetermined maximum value K(L) in relation to rate of change K in an acceleration pedal position is greater than a predetermined frequency, or when averaged value K(AVE) of rate of change K in an acceleration pedal position is greater than a predetermined value.

When the total of the load frequencies of rate of change K in an acceleration pedal position greater than a predetermined maximum value K(L) of rate of change K in an acceleration pedal position is less than a predetermined frequency, and when averaged value K(AVE) of rate of change K in an acceleration pedal position is smaller than a predetermined value, the deterioration degree of battery 400 is determined to be smaller than a predetermined value. It should be noted that the deterioration degree of battery 400 may be determined to be smaller than a predetermined value when at least either one of the conditions is satisfied, i.e., when the total of load frequencies of rate of change K in an acceleration pedal position greater than a predetermined maximum value K(L) in relation to rate of change K in an acceleration pedal position is less than a predetermined frequency, or when averaged value K(AVE) of rate of change K in an acceleration pedal position is smaller than a predetermined value.

As described above, hybrid ECU 600 in the control apparatus according to the present embodiment determines the deterioration degree of battery 400 using rate of change K in an acceleration pedal position and the load frequency thereof Thus, the effect similar to that attained by the control apparatus according to the first embodiment can also be attained.

Fifth Embodiment

Figure 10:
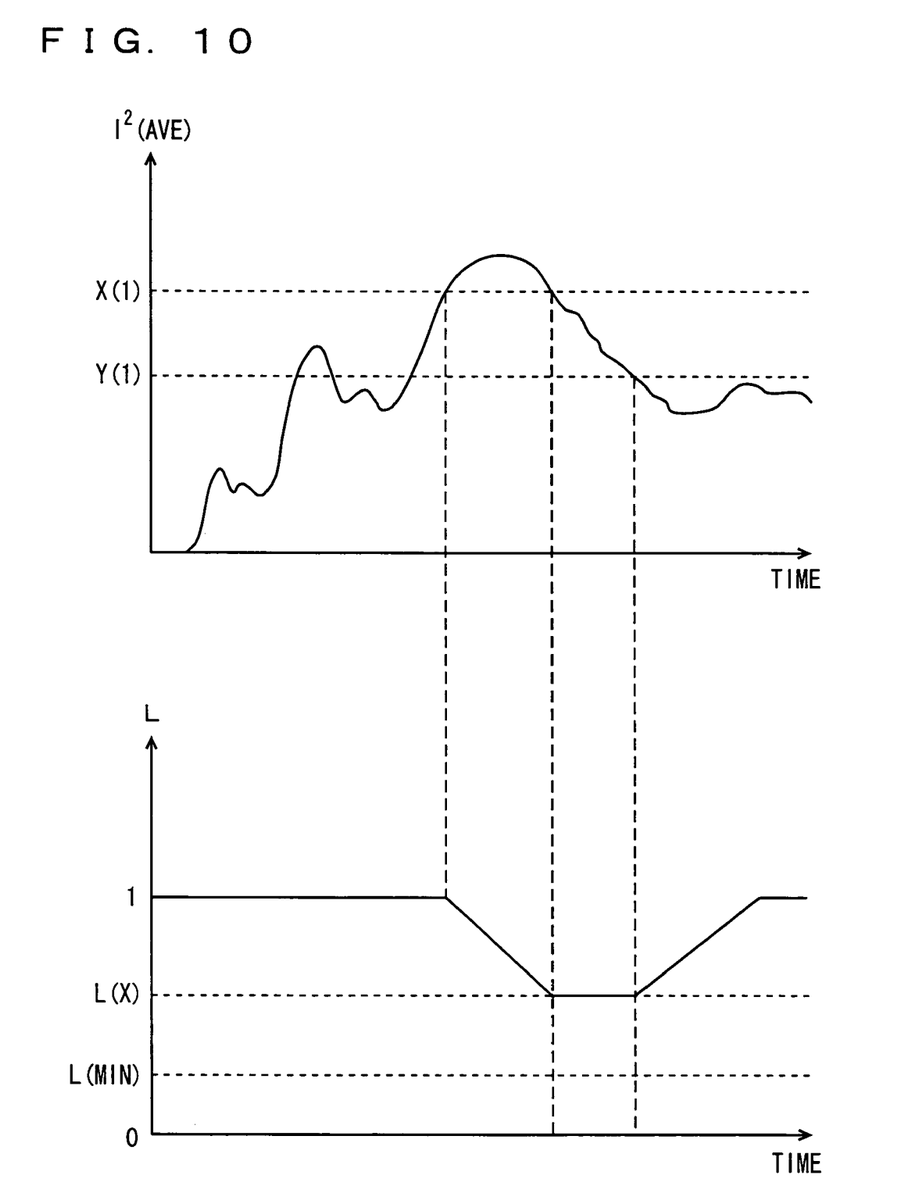
FIG. 10 is a timing chart showing the corresponding relationship between a square-average value $I^2$ (AVE) of a charging/discharging current value and a regulation coefficient L.
Figure 11:
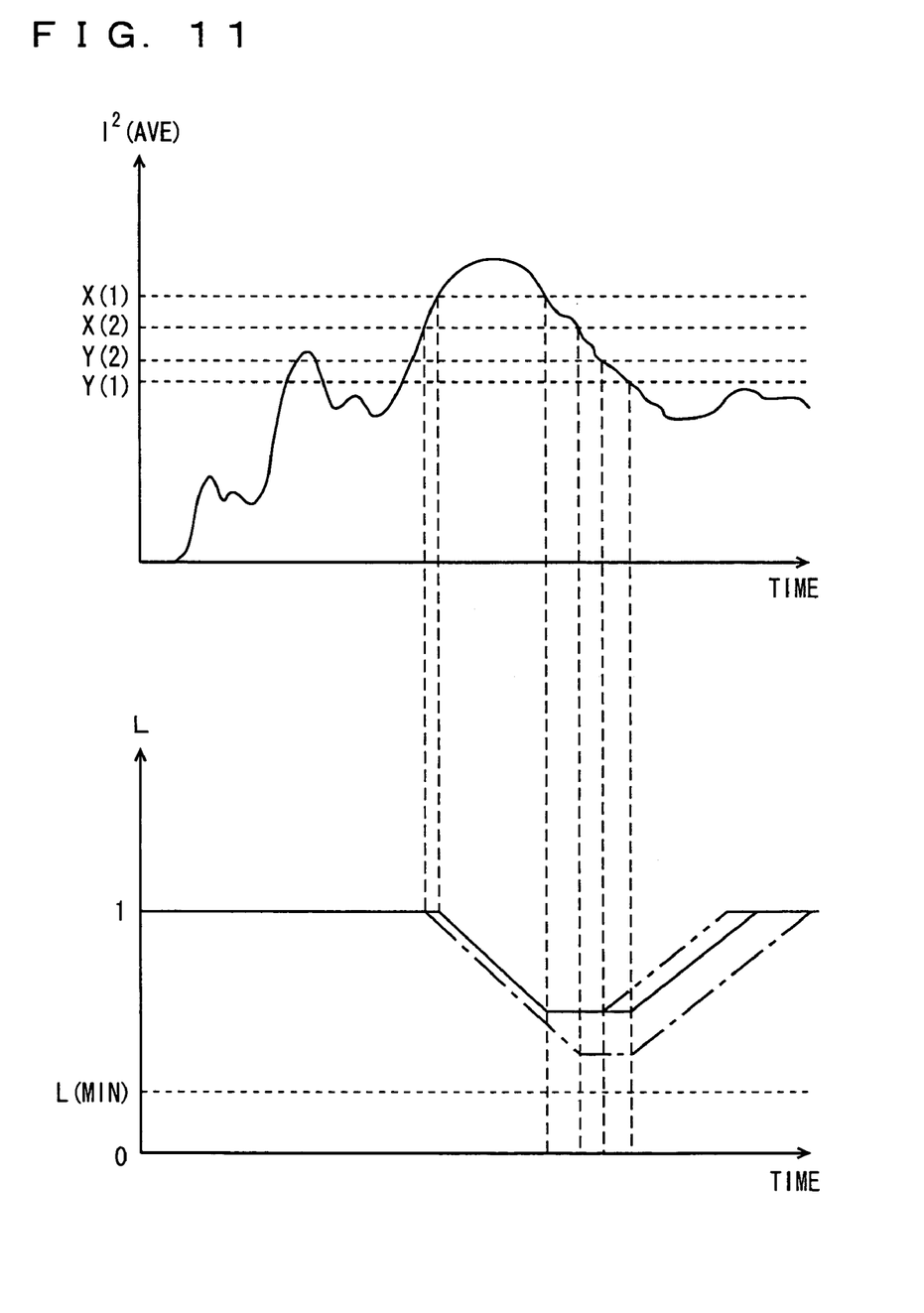
FIG. 11 is a timing chart showing the corresponding relationship between a square-average value $I^2$ (AVE) of a charging/discharging current value and a regulation coefficient L.

Referring to FIGS. 10 and 11, a control apparatus according to a fifth embodiment of the present invention will be described. The aforementioned hybrid ECU 600 in the control apparatus according to the first embodiment tightens and relaxes the regulation of charging/discharging power by changing the charging/discharging power regulation map. In the present embodiment, regulation of charging/discharging power is tightened and relaxed by changing a threshold value related to a coefficient (hereinafter referred to as regulation coefficient L) by which W(IN) and W(OUT) are multiplied. Other hardware configuration and process flow are the same as in the first embodiment. Their respective functions are also the same. Accordingly, detailed description thereof will not be repeated here.

First, regulation coefficient L is described. Hybrid ECU 600 regulates a charging power value to battery 400 and a discharge power value from battery 400 so that they do not exceed values L×W(OUT) and L×W(IN), which are obtained by W(OUT) and W(IN) determined based on the charging/discharging power regulation map shown in FIG. 3 being multiplied by regulation coefficient L (0<L<1), respectively. Referring to FIG. 10, one example is described in which this regulation coefficient L is set. Regulation coefficient L is determined based on square-average value $I^2$(AVE) of a charging/discharging current value. When square-average value $I^2$(AVE) of a charging/discharging current value exceeds X(1), a predetermined value α (0<α<1) is subtracted from regulation coefficient L, and thus regulation coefficient L becomes small. This process is constantly performed while square-average value $I^2$(AVE) of a charging/discharging current value exceeds X(1). FIG. 10 shows a case where regulation coefficient L is decreased to L(X). When square-average value $I^2$(AVE) of a charging/discharging current value becomes smaller than X(1), regulation coefficient L is maintained. When square-average value $I^2$(AVE) of a charging/discharging current value further becomes small and becomes smaller than Y(1), then a predetermined value β (0<β<1) is added to regulation coefficient L, and thus regulation coefficient L becomes great. It should be noted that the addition to regulation coefficient L is performed so as not to exceed 1, and the subtraction is performed so as not to become smaller than the minimum value L (MIN).

Hybrid ECU 600 in the control apparatus according to the present embodiment tightens and relaxes the regulation of charging/discharging power to/from battery 400 by changing threshold values X and Y with which regulation coefficient L is changed, instead of changing the charging/discharging power regulation map as in the aforementioned first embodiment. When the deterioration degree of battery 400 is determined to be greater than a predetermined degree (YES at S200), as shown in FIG. 11, X(1) is decreased to X(2). In this case, when square-average value $I^2$(AVE) of a charging/discharging current value exceeds a predetermined value of X(2) (X(1)>X(2)), as indicated by an alternate long and short dash line, a predetermined value α (0<α<1) is subtracted from regulation coefficient L, and thus regulation coefficient L becomes small. Thus, as the absolute values of W(OUT) and W(IN) are decreased based on the state of square-average value $I^2$(AVE) of a charging/discharging current value being smaller than X(1), the regulation is tightened. It should be noted that threshold value Y may be decreased in place of threshold value X. Additionally, both of the threshold values may be decreased.

When the deterioration degree of battery 400 is determined to be smaller than a predetermined degree (YES at S400), Y(1) is increased to Y(2). In this case, after square-average value $I^2$(AVE) of a charging/discharging current value exceeds a predetermined value of X(1) and regulation coefficient L becomes small, when square-average value $I^2$(AVE) of a charging/discharging current value becomes smaller than Y(2) (Y(1)<X(2)), as indicated by an alternate long and double-short dash line, a predetermined value β (0<β<1) is added to regulation coefficient L, and thus regulation coefficient L becomes great. Thus, as the absolute values of W(OUT) and W(IN) are recovered based on the state of square-average value $I^2$(AVE) of a charging/discharging current value being greater than Y(1), the regulation is relaxed. It should be noted that threshold value X may be increased in place of threshold value Y. Additionally, both of the threshold values may be increased.

As described above, hybrid ECU in the control apparatus according to the present embodiment tightens and relaxes the regulation of charging/discharging power to/from the battery by changing threshold values X and Y. With such a configuration also, the effect similar to that attained by the control apparatus according to the first embodiment can be attained.

Other embodiment

Among the aforementioned first, third and fourth embodiment, the methods for determining the deterioration degree of battery 400 according to any two embodiments can be combined to determine the deterioration degree of battery 400. It is also possible to combine the methods for determining the deterioration degree of battery 400 according to the three embodiments to determine the deterioration degree of battery 400.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus of an electricity accumulation mechanism mounted on a vehicle, comprising:
    regulation means for regulating charging power to said electricity accumulation mechanism and discharging power from said electricity accumulation mechanism;
    detect means for detecting a value related to at least one of a square-average value of a charging and discharging current of said electricity accumulation mechanism, a temperature of said electricity accumulation mechanism and a rate of change in an acceleration pedal position;
    storage means for storing a history related to said detected value;
    calculation means for calculating a load frequency based on at least one of the square-average value of the charging and discharging current of said electricity accumulation mechanism, the temperature of said electricity accumulation mechanism and the rate of change in an acceleration pedal position;
    determination means for determining a deterioration degree of said electricity accumulation mechanism based on said stored history; and
    adjustment means for adjusting regulation by said regulation means based on said deterioration degree, so that a load frequency is substantially equalized at different values for at least one of square-average value of the charging and discharging current of said electricity accumulation mechanism, the temperature of said electricity accumulation mechanism, and the rate of change in an acceleration pedal position, wherein
    said adjustment means includes means for relaxing said regulation when said deterioration degree is determined to be smaller than a predetermined degree, and
    said adjustment means includes means for tightening said regulation when said deterioration degree is determined to be greater than a predetermined degree.

2. The control apparatus of an electricity accumulation mechanism according to claim 1, further comprising:
    calculation means for calculating a frequency of detecting a value in a predetermined range in relation to actuation of said electricity accumulation mechanism based on said stored history, wherein
    said determination means includes means for determining that a deterioration degree of said electricity accumulation mechanism is smaller than a predetermined degree when said calculated frequency is less than a predetermined frequency and a deterioration degree of said electricity accumulation mechanism is larger than said predetermined degree when said calculated frequency is more than said predetermined frequency.

3. The control apparatus of an electricity accumulation mechanism according to claim 1, further comprising:
    means for storing a map related to regulation of charging power to said electricity accumulation mechanism and discharging power from said electricity accumulation mechanism, wherein
    said regulation means includes means for regulating charging power to said electricity accumulation mechanism and discharging power from said electricity accumulation mechanism based on said map, and
    said adjustment means includes means for changing said map to adjust said regulation.

4. A control apparatus of an electricity accumulation mechanism mounted on a vehicle, comprising:
    a regulation unit regulating charging power to said electricity accumulation mechanism and discharging power from said electricity accumulation mechanism;
    a detect unit detecting a value related to at least one of a square-average value of a charging and discharging current of said electricity accumulation mechanism, a temperature of said electricity accumulation mechanism and a rate of change in an acceleration pedal position;
    a calculation unit for calculating a load frequency based on at least one of the square-average value of the charging and discharging current of said electricity accumulation mechanism, the temperature of said electricity accumulation mechanism and the rate of change in an acceleration pedal position;
a storage unit storing a history related to said detected value;
a determination unit determining a deterioration degree of said electricity accumulation mechanism based on said stored history; and
an adjustment unit adjusting regulation by said regulation unit based on said deterioration degree, so that a load frequency is substantially equalized at different values for at least one of square-average value of the charging and discharging current of said electricity accumulation mechanism, the temperature of said electricity accumulation mechanism, and the rate of change in an acceleration pedal position, wherein
said adjustment unit relaxes said regulation when said deterioration degree is determined to be smaller than a predetermined degree, and
said adjustment unit tightens said regulation when said deterioration degree is determined to be greater than a predetermined degree.

5. The control apparatus of an electricity accumulation mechanism according to claim 4, further comprising:
a calculation unit calculating a frequency of detecting a value in a predetermined range in relation to actuation of said electricity accumulation mechanism, based on said stored history, wherein
said determination unit determines that a deterioration degree of said electricity accumulation mechanism is smaller than a predetermined degree when said calculated frequency is less than a predetermined frequency and a deterioration degree of said electricity accumulation mechanism is larger than said predetermined degree when said calculated frequency is more than said predetermined frequency.

6. The control apparatus of an electricity accumulation mechanism according to claim 4, further comprising:
a map storage unit storing a map related to regulation of charging power to said electricity accumulation mechanism and discharging power from said electricity accumulation mechanism, wherein
said regulation unit regulates charging power to said electricity accumulation mechanism and discharging power from said electricity accumulation mechanism based on said map, and
said adjustment unit changes said map to adjust said regulation.

7. A control apparatus of an electricity accumulation mechanism mounted on a vehicle, comprising:
regulation means for regulating charging power to said electricity accumulation mechanism and discharging power from said electricity accumulation mechanism;
detect means for detecting a value related to current values of charging power to said electricity accumulation mechanism or discharging power from said electricity accumulation mechanism, and at least one of temperature of said electricity accumulation mechanism and a rate of change in an acceleration pedal position;
calculation means for calculating a load frequency based on at least one of the square-average value of the charging and discharging current of said electricity accumulation mechanism, the temperature of said electricity accumulation mechanism and the rate of change in an acceleration pedal position;
storage means for storing a history related to said detected value;
determination means for determining a deterioration degree of said electricity accumulation mechanism based on said stored history; and
adjustment means for adjusting regulation by said regulation means based on said deterioration degree, so that a load frequency is substantially equalized at different values for at least one of square-average value of the charging and discharging current of said electricity accumulation mechanism, the temperature of said electricity accumulation mechanism, and the rate of change in an acceleration pedal position, wherein
said adjustment means includes means for relaxing said regulation when said deterioration degree is determined to be smaller than a predetermined degree, and
said adjustment means includes means for tightening said regulation when said deterioration degree is determined to be greater than a predetermined degree.

8. A control apparatus of an electricity accumulation mechanism mounted on a vehicle, comprising:
a regulation unit regulating charging power to said electricity accumulation mechanism and discharging power from said electricity accumulation mechanism;
a detect unit detecting a value related to current values of charging power to said electricity accumulation mechanism or discharging power from said electricity accumulation mechanism, and at least one of temperature of said electricity accumulation mechanism and a rate of change in an acceleration pedal position;
a calculation unit for calculating a load frequency based on at least one of the square-average value of the charging and discharging current of said electricity accumulation mechanism, the temperature of said electricity accumulation mechanism and the rate of change in an acceleration pedal position;
a storage unit storing a history related to said detected value;
a determination unit determining a deterioration degree of said electricity accumulation mechanism based on said stored history; and
an adjustment unit adjusting regulation by said regulation unit based on said deterioration degree, so that a load frequency is substantially equalized at different values for at least one of square-average value of the charging and discharging current of said electricity accumulation mechanism, the temperature of said electricity accumulation mechanism, and the rate of change in an acceleration pedal position, wherein
said adjustment unit relaxes said regulation when said deterioration degree is determined to be smaller than a predetermined degree, and
said adjustment unit tightens said regulation when said deterioration degree is determined to be greater than a predetermined degree.

* * * * *